United States Patent [19]

Langdon

[11] 3,954,886

[45] May 4, 1976

[54] ALKALI STABLE POLYOXYETHYLENE ACETAL SURFACTANTS

[75] Inventor: William K. Langdon, Grosse Ile, Mich.

[73] Assignee: BASF Wyandotte Corporation, Wyandotte, Mich.

[22] Filed: Nov. 22, 1974

[21] Appl. No.: 526,171

[52] U.S. Cl. .......................... 260/615 A; 252/358; 252/DIG. 1; 252/351; 252/319; 260/613 B; 260/348 R
[51] Int. Cl.$^2$ .................... C07C 43/00; C07C 43/30
[58] Field of Search .............................. 260/615 A

[56] References Cited
UNITED STATES PATENTS

| | | | |
|---|---|---|---|
| 3,024,284 | 3/1962 | Howard et al. ................. | 260/615 A |
| 3,244,753 | 6/1960 | Leory ............................. | 260/615 A |

FOREIGN PATENTS OR APPLICATIONS

| | | | |
|---|---|---|---|
| 1,600,907 | 9/1970 | France ........................... | 260/615 A |
| 2,067,584 | 7/1971 | France ........................... | 260/615 A |

OTHER PUBLICATIONS

Sorrenson, et al., U.S. Published Patent Application B363205, 1/28/75, filed 5/23/73.

*Primary Examiner*—Howard T. Mars
*Attorney, Agent, or Firm*—Norbert M. Lisicki; Bernhard R. Swick; Robert E. Dunn

[57] ABSTRACT

Alkali stable surfactants are prepared by the sequential reaction of polyoxyalkylene compounds with high molecular weight alkyl vinyl ether followed by low molecular weight alkyl vinyl ether.

6 Claims, No Drawings

ALKALI STABLE POLYOXYETHYLENE ACETAL SURFACTANTS

BACKGROUND OF THE INVENTION

1. Field of the Invention

The present invention relates to polyacetal compounds which are useful as surfactants and more specifically the reaction products of vinyl ether compounds and alkylene oxide polymers.

2. Prior Art

Surface active non-ionic acetals of monoethers of mono and polyalkylene glycols are known in the art. As taught in U.S. Pat. No. 3,244,753 these products are prepared by reacting monoethers of polyalkylene glycols with vinyl ethers in the presence of an acid catalyst and employing specific phosphorous compounds to prevent the formation of colored products. It does not disclose surfactants which are prepared by reacting a hydrophobic high molecular weight alkyl vinyl ether with a hydrophilic ethylene oxide polymer followed by a subsequent reaction with a lower alkyl vinyl ether.

U.S. Pat. No. 2,905,719 teaches the preparation of surfactants by reacting vinyl ethers containing 8 to 18 carbon atoms with ethoxylated alcohols. It does not disclose the products of the instant invention.

SUMMARY OF THE INVENTION

It has now been discovered that surfactants may be prepared by a process whereby polyoxyalkylene polymer is reacted with high molecular weight alkyl vinyl ether followed by reaction with low molecular weight alkyl vinyl ether. The former alkyl vinyl ether may contain from 8 to 30 carbon atoms. The latter vinyl ether may contain 1 to 6 carbon atoms. The amount of high molecular weight alkyl vinyl ether employed is less than the theoretical amount required to react with all of the hydroxyl groups present in the polyoxyethylene polymer. The remaining hydroxyl groups are then terminated with the lower molecular weight alkyl vinyl ether. This process affords the advantage that a non-ionic surfactant, completely terminated with acetal groups, is obtained without the use of an excess of high molecular weight alkyl vinyl ether. Any excess of such vinyl ethers is removed with difficulty and involves increased costs of manufacture. This process further affords the advantage that the hydrophobe-hydrophile ratio may be varied using less than stoichiometric quantities of the high molecular weight hydrophobic alkyl vinyl ethers while complete termination of the hydroxyl groups is obtained. These products also exhibit good alkali stability since the remaining hydroxyl groups have been terminated with acetal units. The products exhibit excellent surface activity and yet are low foaming materials.

DESCRIPTION OF THE PREFERRED EMBODIMENT

In accordance with this invention polyoxyalkylene polymers are acetal terminated by reacting partially with a high molecular weight alkyl vinyl ether at temperatures ranging from that at which the polyoxyalkylene polymer melts to about 80°C. The reaction may also conveniently take place in the presence of a solvent. Such suitable solvents as tetrahydrofuran, dioxane or glyme may be employed. The acetal reaction may then occur at temperatures as low as 30°C. Low molecular weight alkyl vinyl ether sufficient to react with the remaining hydroxyl groups is then added and the reaction allowed to proceed in the manner similar to that employed during the addition of the higher molecular weight alkyl vinyl ether. This amount may vary from stoichiometric amounts to a 20% excess. The product is then stripped of excess lower molecular weight alkyl vinyl ether.

Examples of acidic catalysts are hydrochloric acid, sulfuric acid, trifluoroacetic acid, paratoluenesulfonic acid, and methane sulfonic acid. Methane sulfonic acid is preferred since it is liquid, highly active in trace quantities and results in little or no color change of the surfactant. The amount of catalyst employed may vary from about 0.1 to about 1 weight percent based on the total weight of reactants. The amount of acid is not critical, however, it is necessary that the acetal reaction occur at an acid pH. This may range from about 2 to about 6.5, preferably from about 3 to about 6. In the event that the polyoxyalkylene polymers contain unneutralized alkaline catalyst, sufficient acid must be added to neutralize that catalyst and to lower the pH of the reaction mixture below a value of 6.

The polyoxyalkylene polymers are prepared by reacting ethylene oxide or a mixture of ethylene and propylene oxide with a base compound containing a plurality of active hydrogen atoms. The relative ratio of ethylene to propylene oxide should be at least 3:1. The number of active hydrogen atoms in the base compound can vary from 2 to 4. The base compounds preferably have molecular weights of less than 200.

The term active hydrogen atom is well known to those skilled in the art. It is sufficiently labile to react with ethylene, propylene and butylene oxide and it reacts with methyl magnesium iodide, liberating methane according to the classical Zerewitinoff reaction. The active hydrogen atoms are normally activated either by being members of a functional group such as a hydroxyl group, a phenol group, a carboxylic acid group, a basic nitrogen group such as an amine group, a hydrazine group, an imine group or an amide group. Active hydrogen atoms may also be activated by proximity to carbonyl groups such as acetoacetic ester. Examples of compounds having active hydrogen atoms which may be used as base compounds for the purposes of this invention include ethylene glycol, diethylene glycol, propylene glycol, dipropylene glycol, butylene glycol, trimethylolpropane, glycerine, glycidol, pentaerythritol, diglycerine, and diglycidol. The individual polyoxyethylene polymers employed in this invention may have molecular weights from 2000 to 24,000, preferably 2000 to 10,000.

The polyoxyethylene polymers which are employed in this invention are generally prepared by carrying out the condensation reaction of the ethylene oxide with the base compound in the presence of an alkaline catalyst in a manner well known to those skilled in the art. Catalysts which may be employed include sodium hydroxide, potassium hydroxide, sodium ethylate, sodium methylate, potassium acetate, sodium acetate, trimethylamine, and triethylamine. Any other types of catalysts commonly used for alkylene oxide condensation reactions may also be employed. After the condensation reaction is completed the catalyst may be removed from the reaction mixture by any known procedure such as neutralization, filtration, or ion exchange. The condensation is preferably carried out at elevated temperatures and pressures. These condensation products are then subjected to the acetal coupling reactions to form the products of this invention.

The alkyl vinyl ethers which are employed have the general formula $$R-O-CH=CH_2$$

where in the case of the lower molecular weight vinyl ethers R may be methyl, ethyl, propyl, butyl, pentyl, or hexyl. The preferred low molecular weight vinyl ether is isobutyl vinyl ether. In the case of the high molecular weight vinyl ethers the alkyl group may range from $C_8$ to $C_{30}$ and preferably $C_{10}$ to $C_{18}$. The products of this invention can be exemplified by the following formula:

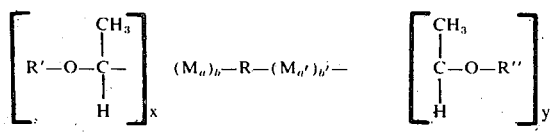

wherein R is the residue of an organic compound selected from the group consisting of ethylene glycol, diethylene glycol, propylene glycol, dipropylene glycol, butylene glycol, trimethylolpropane, glycerine, pentaerythritol and diglycerine minus the hydrogen of the hydroxyl groups, R' is an alkyl radical containing 8 to 30 carbon atoms, R'' is an alkyl radical containing 1 to 6 carbon atoms, M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, $a$ and $a'$ are integers from 5 to 75, $b$ and $b'$ are integers from 1 to 2, $x$ and $y$ are integers whose sum is equal to $b + b'$ wherein the ratio of $x$ to $y$ is from about 19:1 to 1:1.

The amount of high molecular weight vinyl ether, containing 8 to 30 carbon atoms, which is employed, can range from 50 to 95 weight percent of that required to form acetal linkages on the available hydroxyl groups. This, of course, means that the resulting product is a mixture of acetal terminated alkylene oxide polymers. Assuming that the starting polymer had only two available hydrogen atoms, the distribution of molecules would be such that some are terminated with two acetal groups, others are terminated with one acetal group, and still others would contain no acetal groups. This distribution depends on the relative ratio of the reactants employed.

The reaction with the high molecular weight vinyl ether introduces the hydrophobic units into the molecule which are necessary for surface activity. Attempts made to completely react all of the hydroxyl groups with the high molecular weight vinyl ether requires an excess of vinyl ether. The excess is extremely difficult and costly to remove. By completing the acetal reaction with a lower molecular weight alkyl vinyl ether all of the hydroxyl groups are terminated with acetal units and the excess vinyl ether can be readily removed. Requirements of the low molecular weight vinyl ether are: (1) that it react completely with the remaining hydroxyl groups to provide a product with alkali stability, (2) that it be sufficiently volatile to be removable by vacuum stripping, (3) that it has sufficient heat stability not to decompose at the reaction temperatures and (4) that it does not cause an undesirable odor in the final product. Vinyl ethers of methanol, ethanol, propanol, butanol, pentanol and hexanol can be used, however, the vinyl ether of isobutyl alcohol is preferred. The time required for the acetal terminating reaction is generally not a critical factor but will vary with the concentration of reactants and reaction temperatures. Thus, the time can vary from about 15 minutes to about 10 hours. From an economic point of view, however, it is impractical to continue the reaction for more than 10 hours. Generally the reactions are completed within 5 hours.

The acetal terminated polyoxyethylene polymers are surfactants which are useful for a number of applications. They may be used as biodegradable or quasi-biodegradable surfactants. The surfactants can be used in applications requiring good alkali stability and are useful as anti-foaming agents and as surfactants where very little foam is required. They may be used as surfactants in textile applications in which the effect of the surfactants is destroyed before subsequent processing steps are carried out. Destruction of surface activity can be readily accomplished by passing the textile material through a slightly acidic treating bath.

The following Examples are provided to further illustrate the invention. In these Examples the polyoxyethylene polymers designated as Polyols A, B and C are as follows:

Polyol A was prepared by reacting ethylene glycol with sufficient ethylene oxide to obtain a molecular weight of about 4000.

Polyol B was prepared by reacting ethylene glycol with sufficient ethylene oxide to obtain a molecular weight of about 6000.

Polyol C was prepared by reacting ethylene glycol with sufficient ethylene oxide to obtain a molecular weight of about 2000.

The following procedure was employed to prepare the Examples listed below.

A clean, dry, 2 liter reaction flask equipped with a stirrer, thermometer, reflux condenser, addition funnel and vacuum pump was charged with 0.1 gram mole of the Polyol as designated in the Examples and stripped at about 100°C. and 2 mm pressure to remove moisture. After cooling to about 65°C., 0.1% of methane sulfonic acid, based on the weight of Polyol, was added. The type and quantity of high molecular weight alkyl vinyl ether as shown in the Examples was then added and allowed to react at a temperature of 65°C. for 1.5 hours. The appropriate amount of isobutylvinylether (IBVE) was then added to the reaction flask and allowed to react at 65°C. for 0.5 hour. One percent by weight of N,N,N',N'-tetrakis-2-hydroxy propyl ethylene diamine was added to the finished product to neutralize the acid catalyst. The reaction mixture was then stripped for 0.5 hour at 80°C. and 2 mm pressure. The products obtained had the properties listed below.

| Examples | Polyol | Vinyl ether Type | Vinyl ether Moles/mole of Polyol | IBVE Moles/mole of Polyol | M.P., °C. | Surf.Tens. dynes/cm 25°C. | Foam Height 400 ml/min. 77°F. | Foam Height 400 ml/min. 120°F. | Product appearence 0.1% solution | Cloud Point °C. |
|---|---|---|---|---|---|---|---|---|---|---|
| 1 | A | C-10 | 1.0 | 1.2 | 52.0 | 49.1 | 40/17 | 55/7 | clear | 84 |
| 2 | A | C-10 | 1.5 | 0.7 | 50.5 | 50.7 | 15/5 | 40/6 | sl.haze | 66 |
| 3 | A | C-12 | 1.0 | 1.2 | 54.0 | 44.7 | 15/4 | 35/5 | clear | 84 |
| 4 | A | C-12 | 1.25 | 0.95 | 51.5 | 43.7 | 17/5 | 30/10 | clear | 79 |
| 5 | A | C-18 | 1.0 | 1.2 | 51.5 | 46.5 | 15/5 | 120/30 | sl.haze | 90 |
| 6 | A | C-18 | 1.0 | 1.2 | 53.5 | 51.4 | 12/6 | 115/28 | sl.haze | 93 |
| 7 | A | C-18 | 1.25 | 0.95 | 52.5 | 47.0 | 10/3 | 90/25 | sl.haze | 91 |
| 8 | A | C-18 | 1.25 | 0.95 | 53.0 | 53.0 | 10/4 | 75/25 | sl.haze | 91 |
| 9 | A | C-18 | 1.50 | 0.7 | 51.0 | 52.1 | 25/10 | 80/21 | sl.haze | 91 |
| 10 | A | C-18 | 1.75 | 0.45 | 54.6 | 47.1 | 20/4 | 60/15 | sl.haze | 90 |
| 11 | B | C-12 | 1.0 | 1.2 | 58.0 | 41.7 | 65/27 | 50/8 | clear | 96 |
| 12 | B | C-12 | 1.25 | 0.95 | 57.0 | 39.8 | 45/15 | 50/11 | clear | 93 |
| 13 | B | C-12 | 1.50 | 0.70 | 56.5 | 40.0 | 30/5 | 35/9 | clear | 89 |
| 14 | B | C-12 | 1.75 | 0.45 | 56.0 | 43.2 | 15/4 | 32/4 | sl.haze | 88 |
| 15 | B | C-18 | 1.0 | 1.2 | 57.5 | 52.0 | 50/30 | 125/50 | clear | 97 |
| 16 | B | C-18 | 1.0 | 1.2 | 55.0 | 49.6 | 40/28 | 100/60 | clear | 96.5 |
| 17 | B | C-18 | 1.25 | 0.95 | 55.5 | 55.6 | 165/80 | 265/110 | clear | 94.5 |
| 18 | B | C-18 | 1.25 | 0.95 | 55.0 | 50.6 | 55/33 | 95/55 | clear | 95 |
| 19 | B | C-18 | 1.5 | 0.7 | 56.5 | 52.2 | 105/40 | 155/75 | sl.haze | 91 |
| 20 | B | C-18 | 1.75 | 0.45 | 56.0 | 55.5 | 50/30 | 135/75 | sl.haze | 94 |
| 21 | C | C-12 | 1.0 | 1.1 | 41.0 | 40.6 | 50/5 | 50/2 | sl.haze | approx.60 |
| 22 | C | C-12 | 1.25 | 0.85 | 40.5 | 38.3 | 40/8 | 34/2 | sl.haze | approx.50 |

These products exhibit good alkali stability. The color of these products was no greater than the color of the respective initiators.

The embodiments of the invention in which an exclusive property or privilege is claimed are defined as follows:

1. A mixture of acetals having the formula:

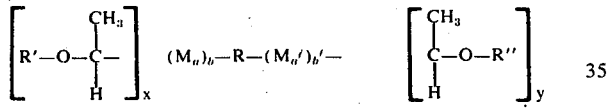

wherein R is an organic compound selected from the group consisting of ethylene glycol, diethylene glycol, propylene glycol, dipropylene glycol, butylene glycol, trimethylolpropane, glycerine, pentaerythritol and diglycerine minus the hydrogens of the hydroxyl groups, R' is an alkyl radical containing 8 to 30 carbon atoms, R'' is an alkyl radical containing 1 to 6 carbon atoms, M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, $a$ and $a'$ are integers from 5 to 75, $b$ and $b'$ are integers from 1 to 2, $x$ and $y$ are integers whose sum is equal to $b + b'$ wherein the ratio of x to y is from about 19:1 to 1:1 prepared by 1. reacting a polyoxyalkylene polyol having a molecular weight range from about 2000 to about 10,000, and which is an adduct of said organic compound and ethylene oxide or a mixture of ethylene oxide and propylene oxide, wherein the oxyethylene content of said adduct is from about 75 to 100 weight percent and the oxypropylene content is from 0 to about 25 weight percent, at a temperature range from about 30° to about 80° C., with an alkyl vinyl ether containing from 10 to 32 carbon atoms in an amount sufficient to react with from 50 to 95 weight percent of the available hydroxyl groups in the presence of a catalyst selected from the group consisting of hydrochloric acid, sulfuric acid, trifluoroacetic acid, para-toluenesulfonic acid and methane sulfonic acid, 2. reacting the residual hydroxyl groups with an excess of alkyl vinyl ether containing from 3 to 8 carbon atoms, and 3. removing the excess alkyl vinyl ether of step (2).

2. The mixture of claim 1 wherein R is ethylene glycol.

3. The mixture of claim 1 wherein R' is selected from the group of alkyl radicals consisting of decyl, dodecyl and octadecyl.

4. The mixture of claim 1 wherein R'' is an isobutyl radical.

5. The product of claim 1 wherein the acid catalyst is methane sulfonic acid.

6. The product of claim 1 wherein the termination with alkyl vinyl ether in steps (1) and (2) is conducted at a pH of about 2 to about 6.5.

* * * * *